May 12, 1931.  O. WITTEL  1,804,730
FILM EDITING MACHINE
Filed Feb. 23, 1928  3 Sheets-Sheet 1
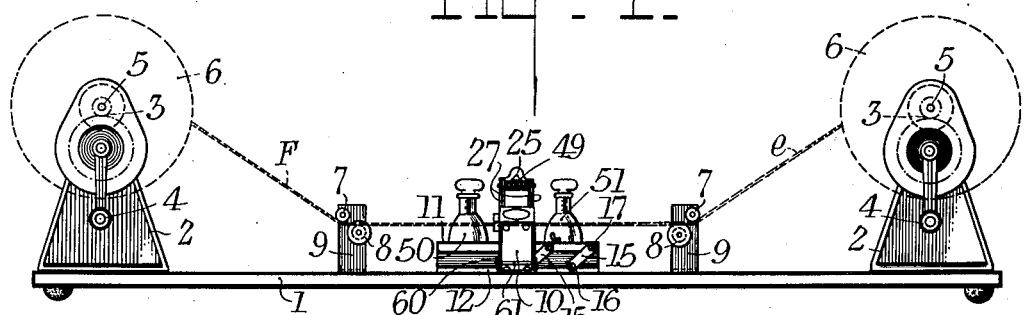
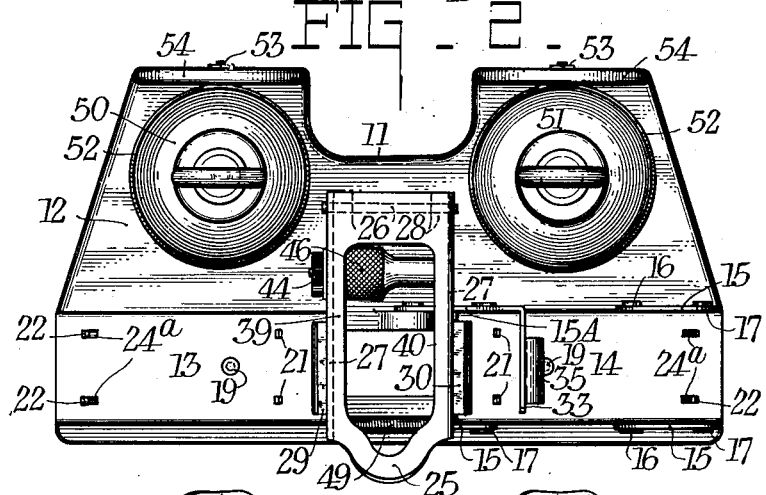
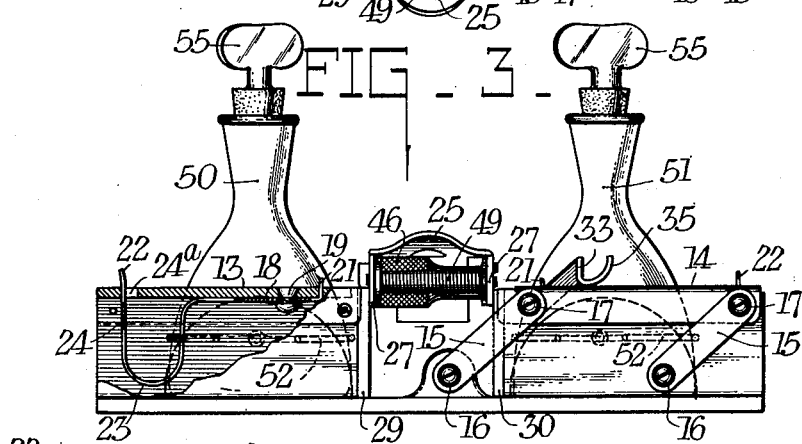
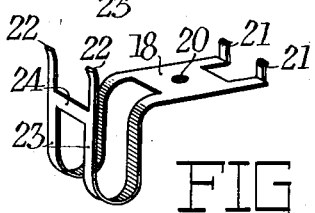
Inventor,
Otto Wittel,
By P. L. Stinchfield
Donald H. Stewart
Attorneys May 12, 1931.  O. WITTEL  1,804,730
FILM EDITING MACHINE
Filed Feb. 23, 1928  3 Sheets-Sheet 2
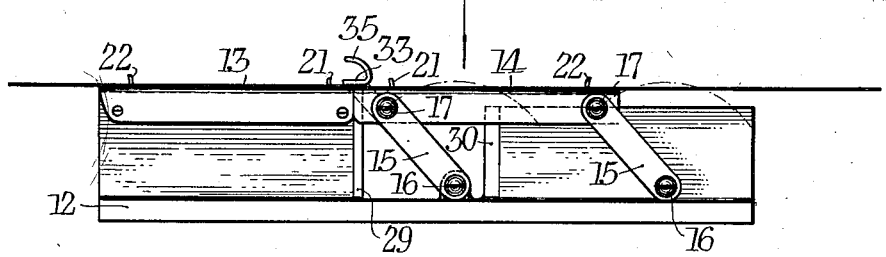
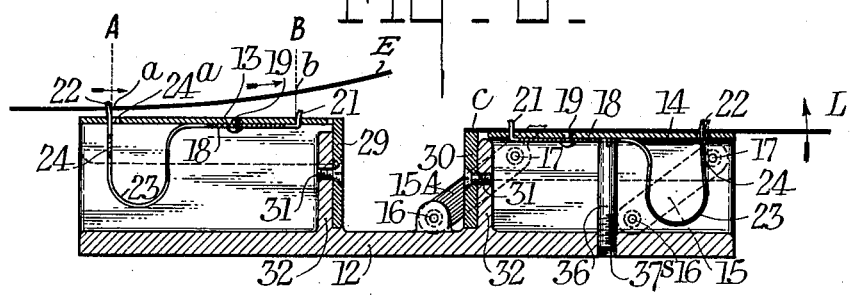
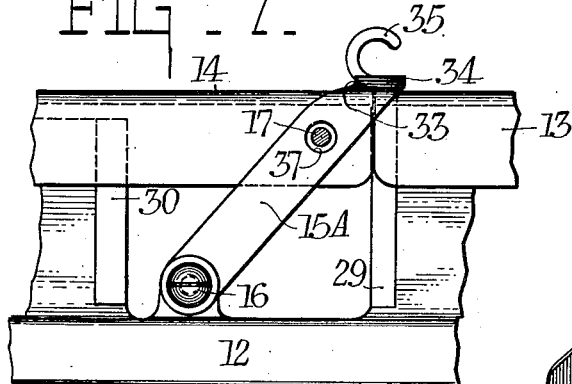
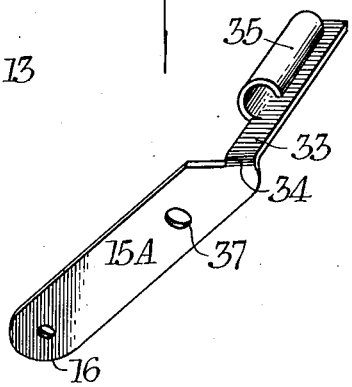
Inventor,
Otto Wittel, May 12, 1931. O. WITTEL 1,804,730
FILM EDITING MACHINE
Filed Feb. 23, 1928  3 Sheets-Sheet 3

Inventor,
Otto Wittel,
By R. L. Stinchfield
Donald H. Stewart
Attorneys

Patented May 12, 1931

1,804,730

UNITED STATES PATENT OFFICE

OTTO WITTEL, OF ROCHESTER, NEW YORK, ASSIGNOR TO EASTMAN KODAK COMPANY, OF ROCHESTER, NEW YORK, A CORPORATION OF NEW YORK

FILM EDITING MACHINE

Application filed February 23, 1928. Serial No. 256,282.

This invention relates to photography, and particularly to film editing machines. One object of my invention is to provide a machine through which film may be passed and inspected for deleting undesirable parts therefrom. Another object is to provide a machine in which a viewing device may be used in connection with a splicing machine for editing film. Another object is to provide a splicing block having film tables which may be separated a sufficient distance to permit the viewing device to operate between the tables. Another object is to provide a movable mount for a film table by which the table may be swung to the stationary table with the film ends in proper registration. Another object of my invention is to provide a film clamp automatically actuated by moving one end of the film into contact with the other. Another object of my invention is to provide a pivoted link movable connection between one film table and the base, one of said links being extended and formed into a handle and film clamp. Another object of my invention is to provide a cutter with a hinged scraper, said scraper being normally concealed in an inoperative position beneath the cutter. Another object of my invention is to provide film registering pins, one set being spring pressed from the other, and having a limited movement with respect thereto, to hold film as well as to register film on the film tables. And other objects will appear from the following specification, the novel features being particularly pointed out in the claims at the end thereof.

Coming now to the drawings wherein like reference characters denote like parts throughout:

Fig. 1 is a front elevation of an editing machine constructed in accordance with and embodying a preferred type of my invention;

Fig. 2 is an enlarged top plan view of the splicing block used in Fig. 1;

Fig. 3 is an enlarged front elevation partially in section of the splicing block shown in Fig. 2;

Fig. 4 is a perspective view of one set of film registering pins removed from a film table;

Fig. 5 is a side elevation of parts of the splicing block showing the film tables moved together in position to join film ends;

Fig. 6 is a view of the parts shown in Fig. 5 in section with the movable table swung back into cutting position;

Fig. 7 is an enlarged fragmentary side elevation showing in detail the combined handle and film clamp carried on the end of one link;

Fig. 8 is a perspective view of the handle clamp link removed from the splicing block;

Fig. 9 is a diagrammatic view illustrating the movement of one of the movable table carrying links;

Figure 10:
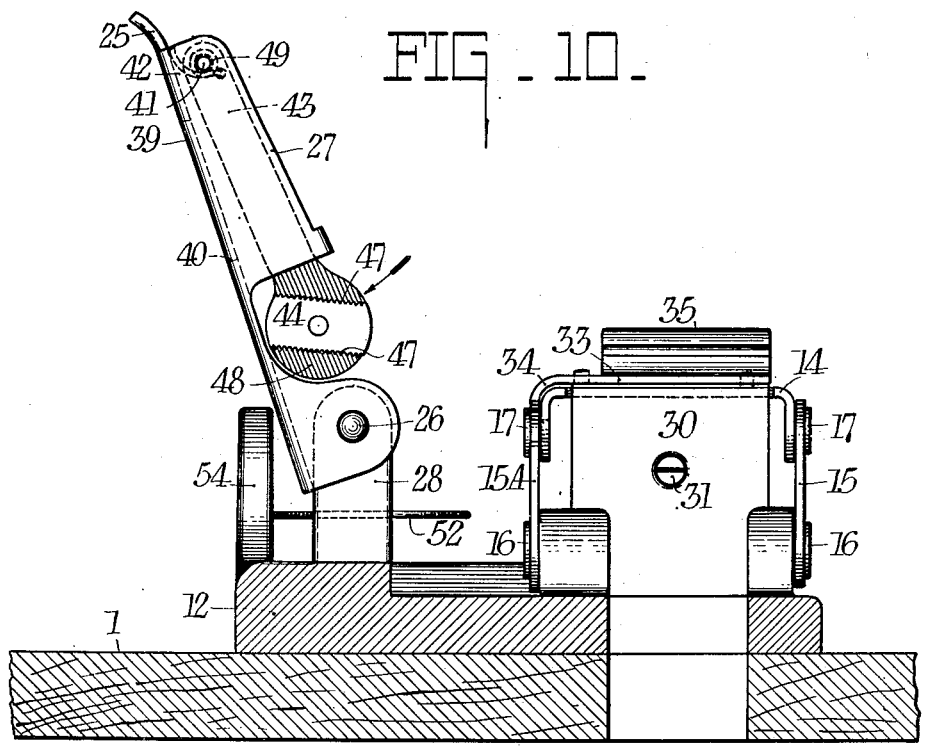
Fig. 10 is an enlarged sectional view showing particularly the cutter and film scraper;

In editing motion picture film, the film may be mounted upon suitable standards, and wound past a viewing station so that undesirable parts may be removed. This can most easily be done by building a splicing block into the editing machine, and positioning it so that the film can be readily cut and spliced and again wound beneath the viewing device.

As shown in Fig. 1, wherein a preferred embodiment of my invention is illustrated, I provide a base 1 with similar standards 2, each carrying film winding gearing 3 operated by a handle 4 so as to turn posts 5 upon which film reels 6 are mounted. Film can, therefore, be readily moved in either direction. A film band F is guided by film rollers 7 and flanged film rollers 8, both of which are supported upon brackets 9 carried by the base 1. Located between the brackets 9 is a viewing apparatus designated broadly as 10, and a splicing apparatus designated broadly as 11.

As best shown in Fig. 2, the splicing apparatus may consist of a base plate 12 supporting a stationary film table 13 and a movable table 14, table 14 being carried by a plurality of parallel links 15, these links being supported on the base by pivots 16, and being attached to the table 14 by pivotes 17. The table 14 may, therefore, swing from the position shown in Fig. 3 to the position shown in Fig. 5. Each of the film tables is provided with a set of film registering and holding pins such as shown in Fig. 4. This set preferably consists of a plate 18 which may be attached to the tables by a rivet 19 passing through an aperture 20. At one end of this plate a pair of spaced pins 21 are bent upwardly, and at the opposite end a pair of pins 22, which will be hereinafter referred to as spring pins, are formed on the ends with spring members 23 which are preferably connected by a bar 24.

The possible movement of the pins 22 relative to pins 21 is limited by the walls of elongated slots 24a in the tables 13 and 14.

As best shown in Fig. 6, the pins 21 and 22 are inclined away from each other, that is, pins 21 lie on one side of a line B, while pins 22 lie on the opposite side of a line A, which is parallel to B. The deflection of the pins has been somewhat magnified in this figure so that it will be clear. The object of this deflection is to securely hold the film in place.

In placing the film in position on the film table, as indicated in Fig. 6, apertures a are engaged on the spring pins 22, and the film is then drawn in the direction shown by the arrow until apertures b may be engaged on the fixed pins 22. This causes the springs 23 to flex, and the pressure exerted by these springs holds the film firmly on the table.

With film ends held on the tables 13 and 14 the ends may be cut by means of the cutter 25, which is hinged upon a pintle 26 passing through the formed over edges 27 of the cutter and through lugs 28 supported by the base 12. As is best shown in Fig. 3, the cutter is substantially U-shaped in cross section, the sides of the U, 27, forming movable knives which cut the film across the fixed knives 29 and 30.

As appears from Figs. 5 and 6, the knife 30 is not so high as knife 29. Both of these knives are attached by screws 31 to flanges 32 formed from the base 12. The reason for knife 30 being shorter than knife 29 is that table 14 when moved by links 15 swings over the top of knife 30 into a position in which it abuts and lies parallel with table 13 so that in this position the film ends will be properly aligned for cementing. It should be noted that as table 14 is moved from the position shown in Fig. 6 to that shown in Fig. 5, the film end L, Fig. 6, is moved up and then down upon the end of the film which lies on table 13, and which has been scraped and coated with cement.

One of the links 15A, as best shown in Fig. 8, has an extension 33 which is bent at 34 to lie over the top of table 14, and which is preferably provided with a rolled handle 35. In the form shown there is an enlarged aperture 37 for the upper stud 17, this aperture making a loose fit so that it is possible to move link 15A about the lower stud 16 a limited distance without moving the other parallel links. This is diagrammatically illustrated in Fig. 9 where the table 14 is shown to be accurately carried and guided by three parallel links, link 15A serving as a handle 35 and a film presser 33 rather than as an actual support for the table 14, aperture 37 being large enough to permit link 15A to move slightly about stud 17.

This is useful since the table 14 may be swung towards table 13 by means of handle 35 and member 33 may firmly press the cemented film ends together by applying pressure to the handle 35. The movement about stud 17 permits member 33 to move into contact with the film ends, and the spring of the metal at the bend 34 and a certain amount of spring in the link 15A about pivots 16 and 17 permits member 33 to contact across its length with the film. In other words, the mounting of link 15A permits a slight universal movement of the clamping member. As shown in Fig. 6, I prefer to provide a post 36 attached at 37S to base 12 for limiting the downward movement of table 14. In this way the distance between the tables 13 and 14 can be accurately adjusted so that the film ends will be cut correctly with respect to their apertures for splicing.

Figures 11, 12:
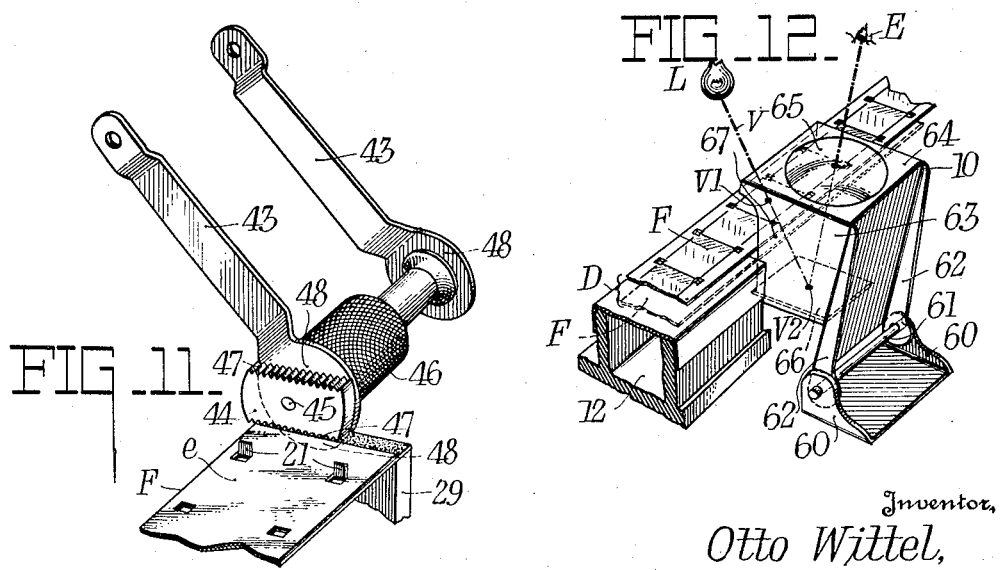
Fig. 11 is a fragmentary perspective view showing the film scraper in an operative position.
Fig. 12 is a perspective view showing the film viewing device swung bewteen the film tables into an operative position.

In order to scrape the emulsion surface e, Fig. 11, from the film band to be spliced, the scraper shown in Figs. 10 and 11 is used. As before explained, the cutter 25 is substantially U-shaped in cross section, that is to say, flanges 27 extend downwardly from an upper flat plate 39 which may be cut away at 40 if desired. A pintle 41 extends between the outer ends 42 of the movable knife blades 27, this pintle supports the arms 43 which carry the scraper 44 by means of a shaft 45 which is free to turn on the arms 43, and which is provided with a handle 46. The cutter preferably consists of a pair of saw toothed edges 47 which cut or file off the emulsion e as they are moved back and forth by the handle 46. It should be noted that the end flanges 48 of arms 43 are rounded in shape so that a portion of one flange by lying against knife 29 forms an accurate guide for the cutter 47 and the width of the emulsion removed will be just that necessary for the splice.

About the pintle 41 is coiled a spring 49 which bears against an arm 43 and a wall 39 of the cutter. The tension on this spring tends to turn and hold the scraper against the cutter inside of the arms 27, as shown in Fig. 10. Thus the scraper is always out of the way when not in use, and may be readily swung from its inoperative position to scrape the film.

For the splicing operation it is usually necessary to first dampen the emulsion $e$ with water or a solvent, and then scrape off the softened emulsion. After being scraped the film cement is applied before the films are brought together by swinging table 14 upon links 15. The base 12, as shown in Fig. 2, carries a pair of bottles 50 and 51 by means of springs 52 which are attached at 53 to upstanding lugs 54. These bottles may contain the necessary solutions with applicators of any desired type supported by their stoppers 55.

In order to determine where the splice should be made the viewing device 10, best shown in Fig. 12, is attached at the base 1 upon a bracket 60, this bracket supporting a hinged pintle 61 and a support which carries a boxlike housing 63 which is open on the side facing the film F. On the top wall 64 of the housing there is a magnifying glass 65 and on the bottom wall there is a mirror 66. The side walls 67 of the housing are spaced apart a distance which will permit the viewing device to be swung between the tables 13 and 14 and between the knives 29 and 30 a short distance, as shown in Fig. 12. The light from a lamp L, which may be the usual room illumination such as a table lamp, will pass along the line V through the film at V1 being reflected at V2 by the mirror 66 so as to pass up through the magnifying lens 65 to the eye E of an observer.

It should be noted from Fig. 1 that when the film is passing for observation it is guided by the rollers 7 and 8, and thus is positioned a short distance, indicated by D, Fig. 12, above the tables 13 and 14, and thus the film perforations pass above the film pins. When a section needs to be removed it is only necessary to press the film down from the full line position, Fig. 12, to the broken line position in the same figure to engage it with the film positioning pins on one table or the other or both. The viewing device 10 may be quickly swung about pintle 61 so that the film may be trimmed down and again moved from the film pins for observation.

The operation of my device is as follows: Film reels 6 are mounted upon the standards 3, one reel bearing film to be edited and the other reel being empty, and film F is then threaded through rollers 7 and 8 and is then threaded to the empty spool. A handle 4 may be turned until it is desired to remove film, the film being observed through the magnifying glass 65. This viewing device may be then swung about pintle 61 and the film may be cut after threading it upon the pins 21—22. A second cut may be made at any desired point, and then after moistening the emulsion $e$ an area may be scraped off as shown in Fig. 11. This area may be then coated with cement, and table 14 may be swung upon links 15 by handle 35, thus bringing the film end down upon the cement covered scraped area of the film upon table 13. By pressing upon handle 35 member 33 will firmly contact with and hold the film ends together for a moment until the cement sets. The film may be removed from the holding and locating pins by drawing up upon the film end E in the direction shown by the arrow in Fig. 6, this movement causing pins 22 to flex springs 23 and permitting the film to be readily stripped from the table. By a slight movement of the winding handle 4 the film may be again drawn up to the position shown in Fig. 1, and the viewing device 10 may be again swung between the tables so that further inspection of the film may take place.

While the description of the editing operations sounds as if considerable time may be necessary to cut the film and splice it, as a matter of fact, in practice the editing and repairing of film may be accomplished very quickly, the cooperation of the viewing and splicing devices being such that either may be quickly used without altering the path of film moving from one reel to the other.

Having thus described my invention, what I claim as new and desire to secure by Letters Patent is,—

1. In a film splicing block, the combination with a base, a stationary table mounted thereon, a movably mounted table, parallel links supporting the movable table on the base, a movable cutter and a pair of fixed cutting blades, the movable table being adapted to swing over the top of one cutting blade on the parallel links.

2. In a film splicing block, the combination with a base, of a pair of tables carried by the base, one table being fixedly mounted thereon, and the other table being movably carried by a plurality of links pivoted to the base and to the table, whereby the second mentioned table may swing to or from the first mentioned table.

3. In a film splicing block, the combination with a base, of a pair of tables carried thereby, one table being fixedly attached to the base, and a plurality of parallel pivoted links carrying the other table, whereby the table carried by the parallel links may be swung thereon to and from the fixedly mounted table.

4. In a film splicing block, the combination with a base, of a pair of tables carried thereby, one table being fixedly attached to the base, and a plurality of parallel pivoted links carrying the other table, one of said links being extended to form a handle for moving the table upon the links.

5. In a film splicing block, the combination with a base, of a pair of tables carried thereby, one table being fixedly attached to the base, and a plurality of parallel pivoted links carrying the other table, one of said links being bent across the table so as to press thereon when the table is swung in one direction.

6. In a film splicing block, the combination with a base, of a pair of tables carried thereby, one table being fixedly attached to the base, and a plurality of parallel pivoted links carrying the other table, one of said links being bent across the table, said link having an up-turned flange to form a handle and presser adapted to contact with and press severed film ends together.

7. In a film splicing block, the combination with a base, of a pair of tables carried thereby, one table being fixedly attached to the base, and a plurality of parallel pivoted links carrying the other table, one of said parallel pivoted links having a loose connection at a pivot permitting limited movement relative to the other links, said link being extended across the table to form a film presser, said limited movement permitting said film presser to be moved into contact with the film without moving the other links.

8. In a film splicing block, the combination with a base, of a pair of tables mounted thereon, one table being movably mounted thereon, a plurality of links pivotally attached to the base and pivotally attached to the movably mounted table, one link being formed into a clamping member extending across said table, said link being loosely mounted upon a pivot whereby movement of the link relative to the table is permitted.

9. In a film splicing block, the combination with a base, of a pair of tables mounted thereon, one table being movably mounted thereon, a plurality of links pivotally attached to the base and pivotally attached to the movably mounted table, one link being formed into a clamping member extending across said table, and means included in the link mounting permitting said link to move relative to said table.

10. In a film splicing block, the combination with a base, of a pair of tables mounted thereon, one table being movably mounted thereon, a plurality of pairs of parallel links pivoted to both the base and table, a bent extension on one link formed across the table to form a clamp, said link having an aperture of larger size than one of its pivotal supports whereby said link may move relative to the other links.

11. In a film splicing block, the combination with a base, of a pair of tables mounted thereon for receiving film, a cutter adapted to move between the tables to sever the film, and a film scraper hingedly attached to the cutter, and a spring acting on the scraper to hold it against the cutter.

12. In a film splicing block, the combination with a base, of a pair of tables mounted thereon, a cutter substantially U-shaped in cross section supported by the base and adapted to sever film carried by the tables, and a film scraper hingedly attached to the inside of the U-shaped cutter, a spring acting between the cutter and scraper for normally holding the latter in an inoperative position between the sides of the U-shaped cutter.

13. In a film splicing block, the combination with a base, of a film table having different sized apertures therein, film aperture pins mounted beneath the tables and being adapted to extend up through the apertures, one pin engaging and being fixedly positioned by one aperture, and the other pin extending through and being movable in the larger aperture whereby relative movement of one pin relative to the other is permitted.

14. In a film splicing block, the combination with a base, of a film table having different sized apertures therein, a pair of film aperture pins carried by a plate, one pin being carried by a spring arm and being adapted to extend up through the larger aperture, the other pin being adapted to extend up and be located by the smaller aperture, the larger aperture limiting the possible movement of the spring pin relative to the fixed pin.

15. In a film splicing block, the combination with a base, of a pair of relatively movable film tables carried thereby, means for moving one table from the other, a viewing device, connections between the viewing device and the base permitting the viewing device to move thereon, said viewing device being movable between the film tables to permit viewing of the film between the tables whereby film may be viewed by an operator to determine the place to cut.

16. In a film splicing block, the combination with a base, of a pair of relatively movable film tables carried thereby, means for moving one table from the other, a viewing device, a hinge connection between the viewing device and base, said hinge being substantially parallel to the direction of movement of the film table, said viewing device being adapted to turn about its hinge to an operative position between said film tables whereby film may be viewed and drawn past said film tables to determine the place to cut.

17. In a film splicing block, the combination with a base, of a pair of film tables supported on the base, one table being fixedly attached to the base, a pivotal mount for the other table on which it may move to and from the first table, a viewing device hinged to the base, said viewing device being adapted to move about its hinge between the tables when the tables are moved apart whereby film may be moved past said viewing device to determine the place to cut.

18. In a film splicing block, the combination with a base, of two film tables carried thereby, a movable mount for one film table, a viewing device for the film including a mirror adapted to be moved to an operative position to reflect an image on a film upwardly, a movable mount for the viewing device, adapted to move to position the mirror beneath the film, said movable table being adapted to move on its mount to permit the viewing device to move the mirror to its operative position whereby film may be viewed to determine the place to cut.

19. In a film splicing block, the combination with a base, of two film tables carried thereby, a movable mount for one film table, a viewing device for the film including a mirror adapted to be moved to an operative position to reflect an image on a film upwardly, and a positive lens for magnifying the reflected image, a hinge connection between the base and viewing device for moving the latter between the film tables to an operative position in which an image on the film is reflected up through the positive lens whereby film may be viewed by an operator to determine the place to cut.

Signed at Rochester, New York this 18th day of February, 1928.

OTTO WITTEL.